(12) United States Patent
Wang (10) Patent No.: US 7,918,427 B2
(45) Date of Patent: Apr. 5, 2011

(54) COMPUTER DOCK STATION

(75) Inventor: Chia-Ming Wang, Shenkeng Township Taipei County (TW)

(73) Assignee: Sallas Industrial Co., Ltd., Taipei County (TW)

( * ) Notice: Subject to any disclaimer, the term of this patent is extended or adjusted under 35 U.S.C. 154(b) by 804 days.

(21) Appl. No.: 11/984,711

(22) Filed: Nov. 21, 2007

(65) Prior Publication Data

US 2009/0127418 A1 May 21, 2009

(51) Int. Cl.
*F16M 11/00* (2006.01)
(52) U.S. Cl. ............... 248/278.1; 248/310; 248/281.11; 248/917; 361/679.02
(58) Field of Classification Search .................... 108/44; 248/278.1, 280.11, 281.11, 310, 917, 919; 361/679.4, 679.09, 679.55; 710/303
See application file for complete search history.

(56) References Cited

U.S. PATENT DOCUMENTS

| | | | | |
|---|---|---|---|---|
| 4,844,387 A * | 7/1989 | Sorgi et al. | ......................... | 108/5 |
| 4,946,120 A * | 8/1990 | Hatcher | ..................... | 248/183.2 |
| 5,595,074 A * | 1/1997 | Munro | ............................... | 70/58 |
| 5,673,628 A * | 10/1997 | Boos | ............................... | 108/44 |
| 5,769,369 A * | 6/1998 | Meinel | ........................ | 248/176.1 |
| 6,021,720 A * | 2/2000 | Boos et al. | ...................... | 108/44 |
| 6,076,787 A * | 6/2000 | Troyer | ........................... | 248/166 |
| 6,585,212 B2 * | 7/2003 | Carnevali | ................ | 248/346.07 |
| 7,032,872 B2 * | 4/2006 | Sullivan | ................... | 248/346.07 |
| 7,384,087 B2 * | 6/2008 | Littlejohn | .................... | 296/37.1 |
| 7,562,852 B2 * | 7/2009 | Wang | ........................ | 248/285.1 |
| 7,611,112 B2 * | 11/2009 | Lin | ............................. | 248/274.1 |
| 7,647,676 B2 * | 1/2010 | Carnevali | ........................ | 24/523 |
| 2008/0029663 A1 * | 2/2008 | Derry et al. | ................ | 248/178.1 |

* cited by examiner

*Primary Examiner* — Terrell Mckinnon
*Assistant Examiner* — Daniel J Breslin
(74) *Attorney, Agent, or Firm* — Rosenberg, Klein & Lee (57) ABSTRACT

A computer dock station includes a bracket covered with a cover member and having a fence at one side and upright pivot pins on the inside, and a locking mechanism, which includes a motive member, two follower members pivoted to the two opposite ends of the motive member and respectively coupled with the respective sliding slot to the upright pivot pins, two clamps respectively mounted on the follower members outside the bracket, and a screw rod threaded through the motive member and pivoted to the bracket and rotatable to move the motive member and to further turn the follower members about the respective upright pivot pins for adjusting the position of the clamps.

14 Claims, 14 Drawing Sheets

COMPUTER DOCK STATION

BACKGROUND OF THE INVENTION

1. Field of the Invention

The present invention relates to a dock station and more particularly, to a computer dock station for holding a computer.

2. Description of the Related Art

Following fast development of industrial technology, computer has been intensively used to perform many operation processes that require a big amount of labor according to conventional methods. Nowadays, industrial computers or control computers commonly seen in factories and plant houses to run different automation processes.

However, the use of an industrial computer or control computer requires a stable tool-operation space or tool-installation space, such as tabletop. However, it is not the best way to provide a table for every industrial computer or control computer in the limited space of an expensive factory or plant house. Therefore, efficient utilization of factory or plant house space is necessary. The use of a regular home computer may encounter the same problem. Specialists are trying hard to design computer deck stations that improve space utilization and facilitate computer operation.

Figure 1:
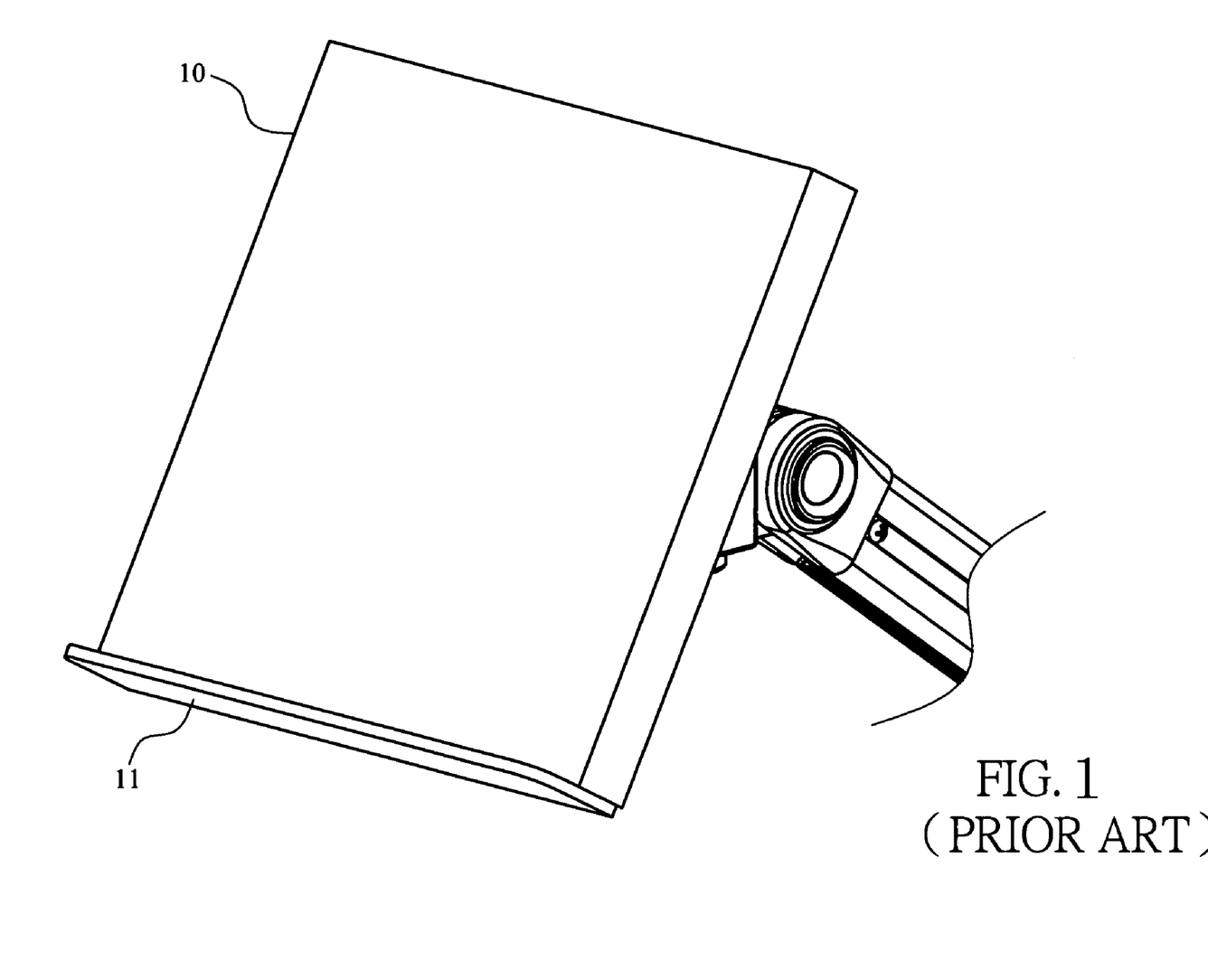
FIG. 1 is a schematic drawing showing a computer dock station according to the prior art.
Figure 2:
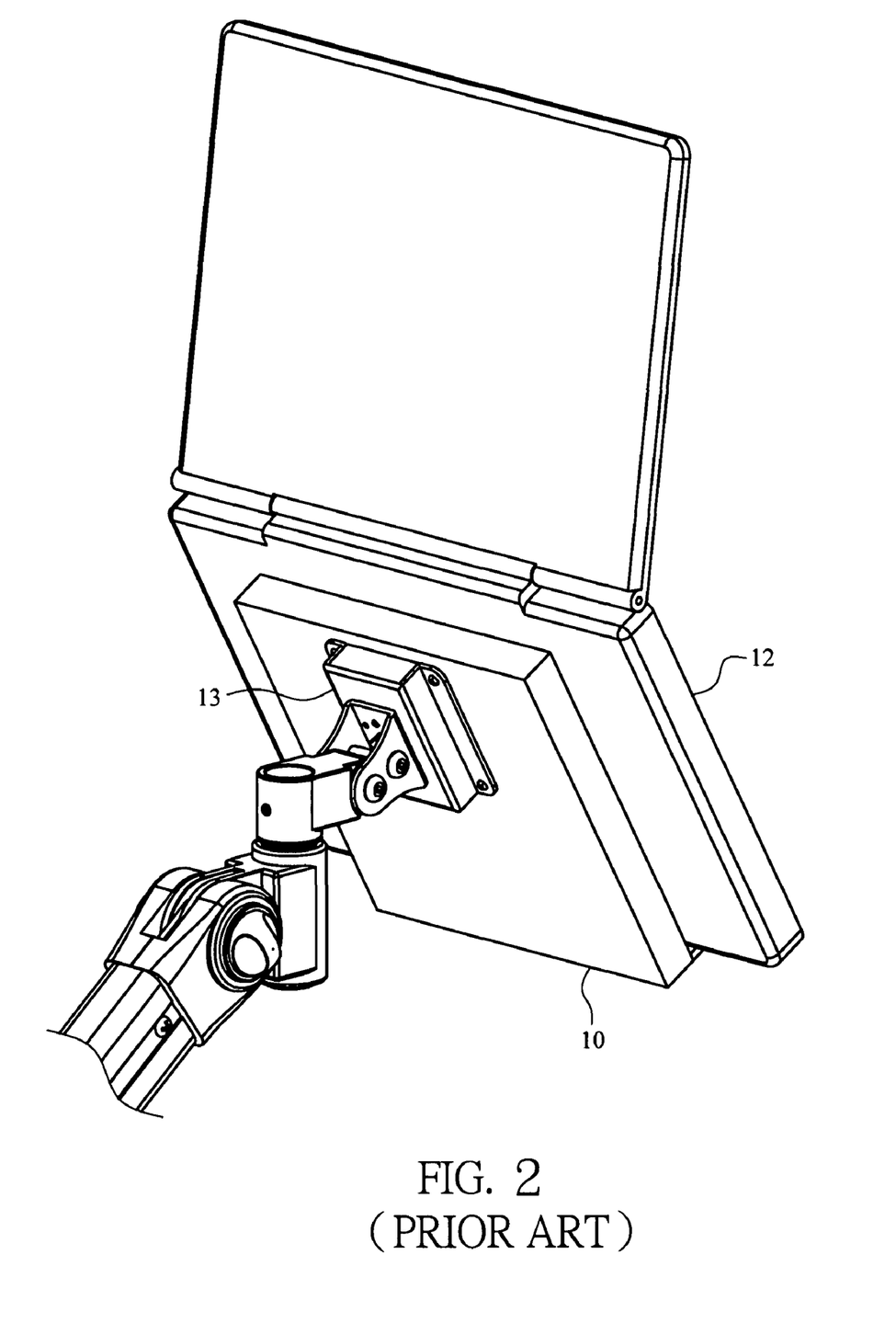
FIG. 2 is a schematic drawing showing an application example of the computer dock station according to the prior art.

FIGS. 1 and 2 show a computer desk station for computer according to the prior art. According to this design, the computer deck station comprises a bracket 10 with a fence 11 at one side for holding a computer 12, and a mount 13 at the back side of the bracket 10 for mounting on, for example, a mechanical arm that facilitates adjustment of the location and angle of the bracket 10 and the computer 12.

However, the fence 11 cannot give an effective support to the computer 12 in case of horizontal inclination of the bracket 10. When this condition occurs, the computer 12 may slip from place or fall from the bracket 10, causing damage or interfering with the operator's physical motion.

SUMMARY OF THE PRESENT INVENTION

The present invention has been accomplished under the circumstances in view. It is one object of the present invention to provide a computer dock station, which holds the loaded computer firmly in place, assuring high security and preventing an industrial accident. It is another object of the present invention to provide a computer dock station, which is adjustable to fit computers of different specifications of size. It is still another object of the present invention to provide a computer dock station, which has a pretty neat looking. It is still another object of the present invention to provide a computer dock station, which facilitates ventilation and accelerates dissipation of heat from the computer carried thereon.

To achieve these and other objects and according to one aspect of the present invention, the computer dock station comprises a bracket, a cover member, and a locking mechanism. The bracket comprises a stop member disposed at one side for stopping a computer, and a plurality of upright pivot pins disposed on the inside. The cover member covers the bracket for supporting a computer on the bracket. The locking mechanism is for locking a computer on the cover member, comprising a motive member, a plurality of follower members, a screw rod, and a plurality of clamps. The motive member has two opposite ends and a screw hole equally spaced from the two opposite ends. The follower members each have a first end respectively pivoted to the two opposite ends of the motive member, a second end, and a sliding slot disposed between the first end and the second end and respectively coupled to the upright pivot pins of the bracket. The screw rod is inserted through the first top member and threaded into the screw hole of the motive member and pivoted to a part of the bracket and rotatable to move the motive member in the bracket. The clamps are respectively provided at the second ends of the follower members for clamping a computer on the cover member.

According to another aspect of the present invention, a flat cushion pad is adhered to the top side of the cover member to decorate the computer dock station and to keep the cover member mounting screws from sight and to give protection to computer surface.

According to still another aspect of the present invention, the cover member and the bracket have openings for ventilation.

According to still another aspect of the present invention, cooling fans are installed in the bracket for causing currents of air to dissipate heat from the computer carried on the cover member.

According to still another aspect of the present invention, a spring clamping bar is provided at one side of the bracket for clamping on one side of the loaded computer opposite to the stop member.

DETAILED DESCRIPTION OF THE PREFERRED EMBODIMENTS

Figure 3:
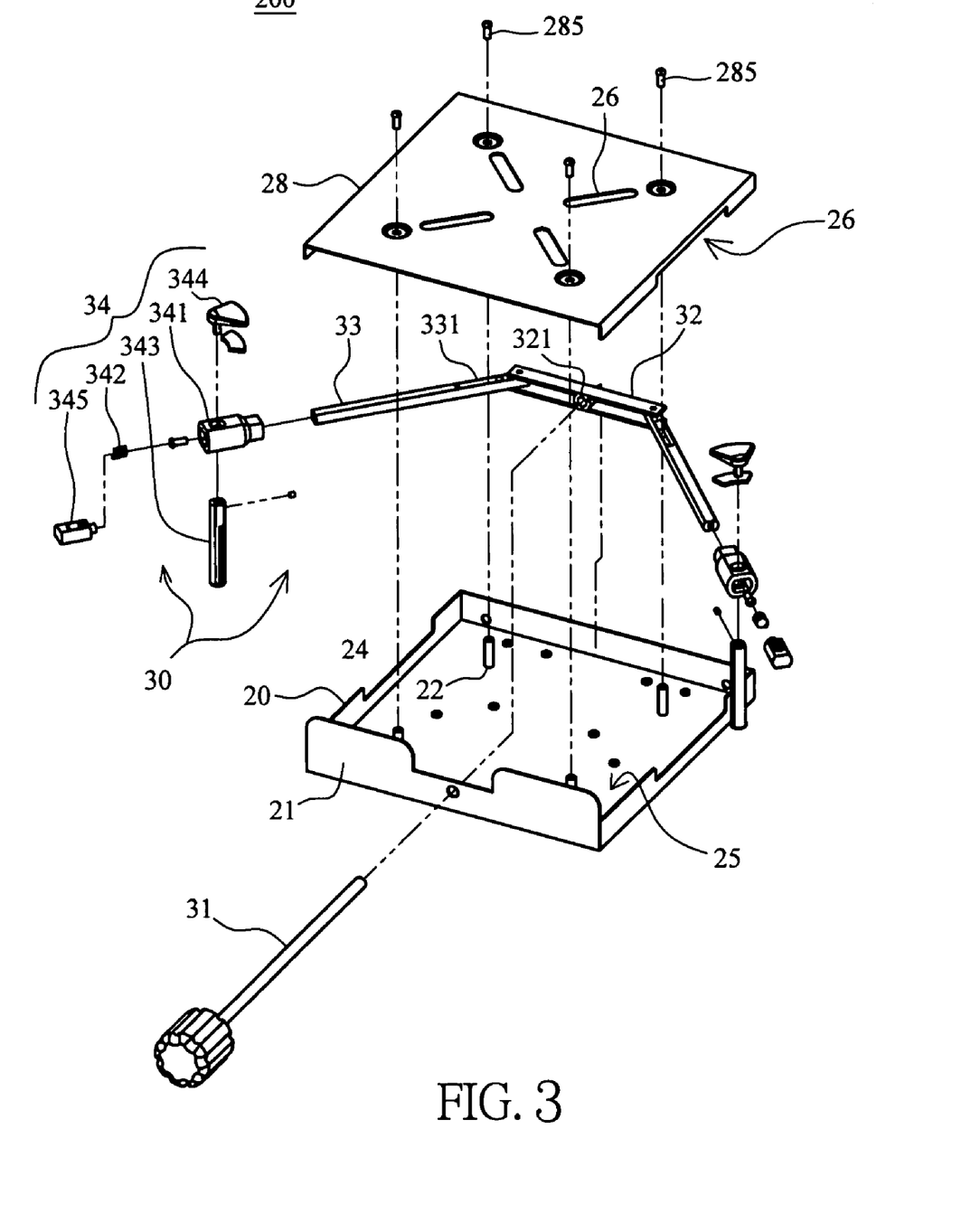
FIG. 3 is an exploded view of a computer dock station in accordance with a first embodiment of the present invention.
Figure 4A:
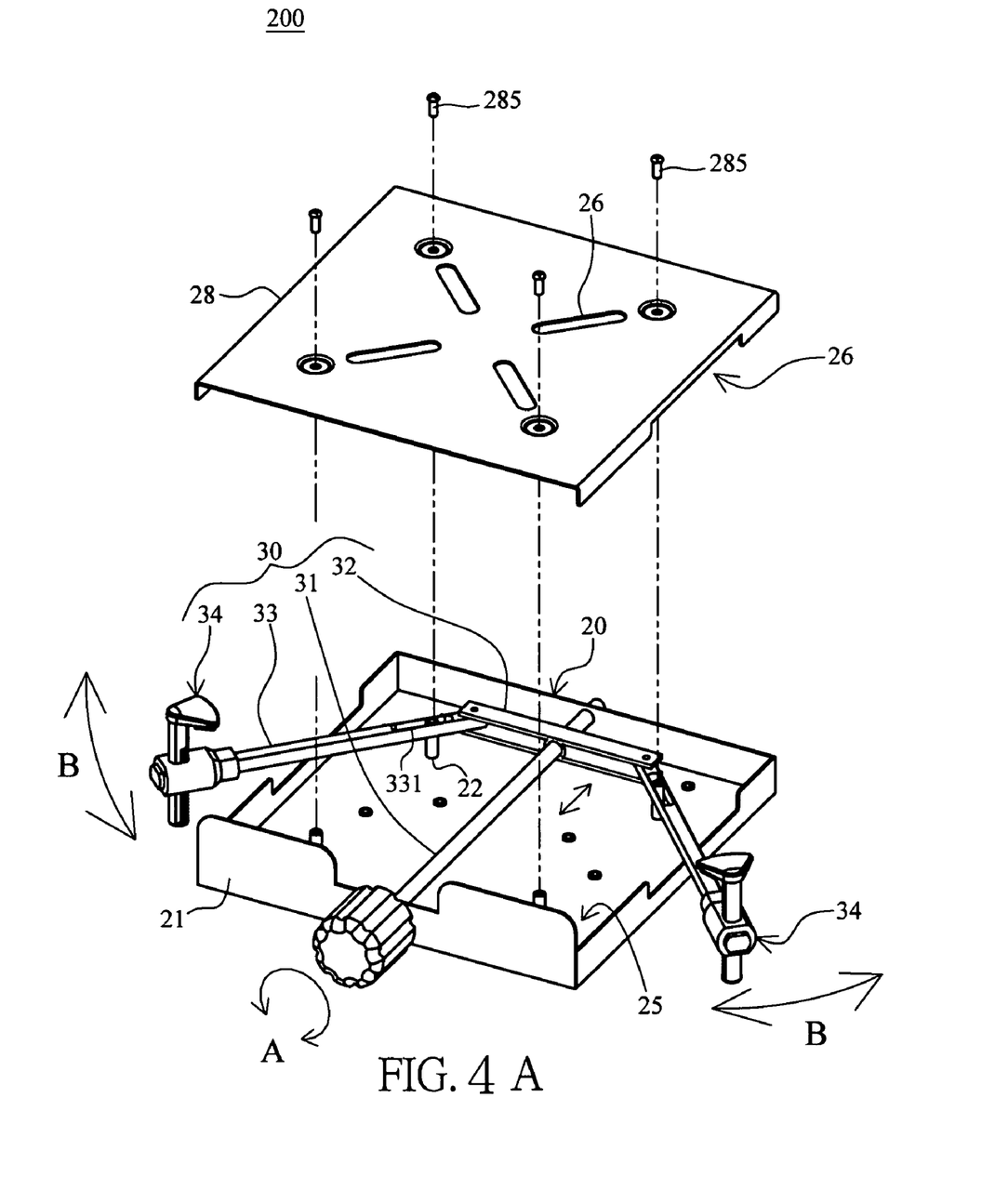
FIG. 4A is an assembly view in an enlarged scale of a part of FIG. 3.
Figure 4B:
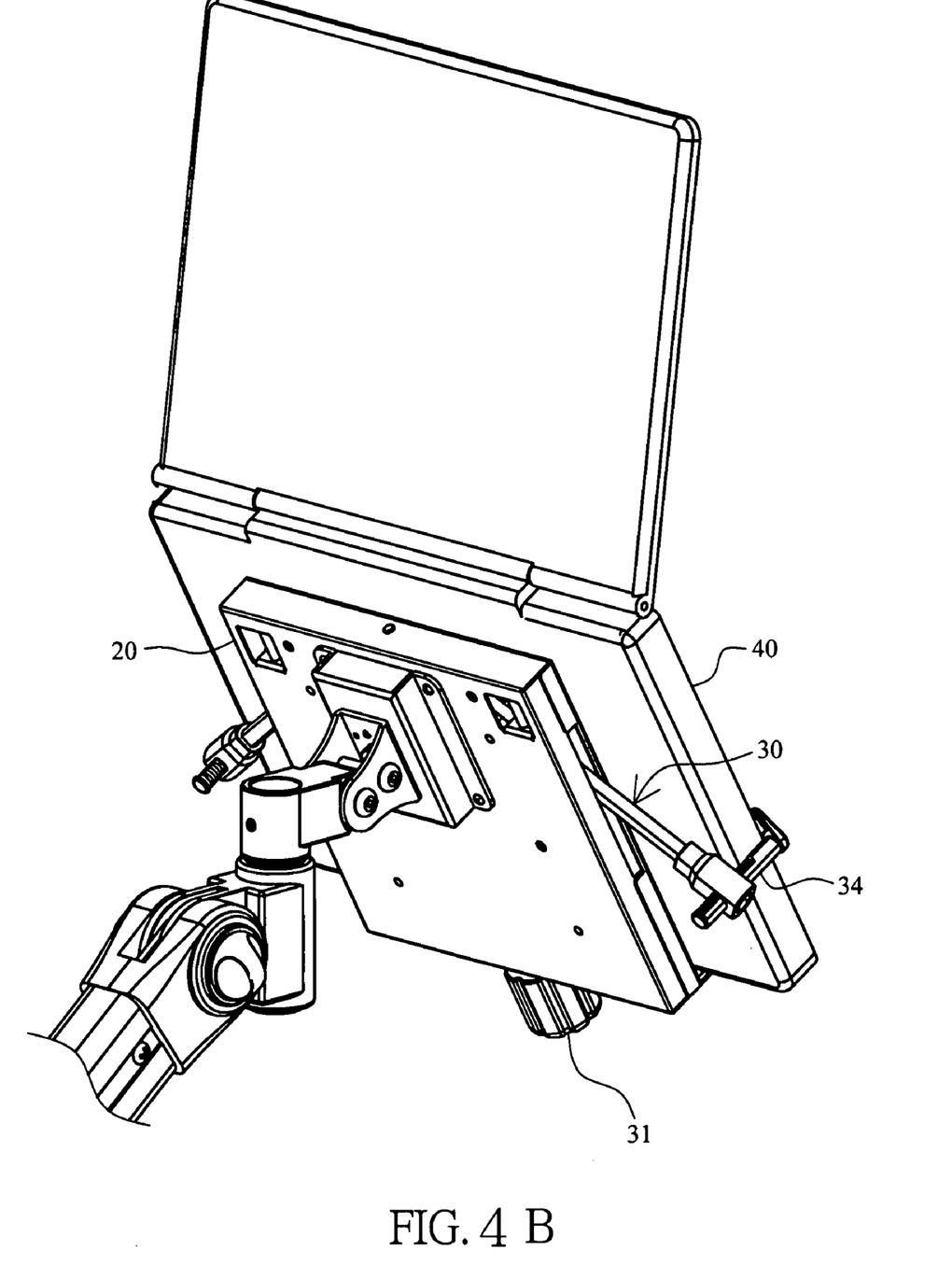
FIG. 4B is a schematic drawing showing an application example of the computer dock station in accordance with the first embodiment of the present invention.

Referring to FIGS. 3, 4A and 4B, a computer dock station 200 in accordance with a first embodiment of the present invention is shown comprising a bracket 20, and a locking mechanism 30. The locking mechanism 30 is comprised of a screw rod 31, a motive member 32, a plurality of follower members 33, and a plurality of clamps 34. The bracket 20 comprises a stop member, for example, a fence 21 at its one side, a plurality of pivot pins 22 vertically disposed on the inside, and a cover plate 28 covered thereon.

The screw rod 31 is inserted into the bracket 20 and threaded into a screw hole 321 of the motive member 32. The follower members 33 each have a longitudinal sliding slot 331. The pivot pins 22 are fixedly mounted in the bracket 20 in vertical and respectively inserted through the longitudinal sliding slots 331 of the follower members 33. Each follower member 33 has one end provided with one clamp 34, and the other end connected to one end of the motive member 32.

Rotating the screw rod 31 (see the double arrowhead line A) causes movement of the motive member 32, and the follower members 33 are relatively moved. Because the longitudinal sliding slots 331 of the follower members 33 are respectively coupled to the respective pivot pins 22, moving the motive member 32 causes the follower members 33 to turn about the respective pivot pins 22, and therefore the clamps 34 are moved with the respective follower members 33 in a respective specific interval, as indicated by the double arrowhead lines B.

Further, the bracket 20 is shaped like a top-open box. The cover plate 28 covered on the bracket 20 and affixed thereto with screws 285, defining with the bracket 20 an accommodation chamber 25. The accommodation chamber 25 accommodates the screw rod 31, the motive member 32, the follower members 33 and the pivot pins 22. Therefore, when the computer dock station is assembled, it has a pretty neat looking and can hold a computer 40 firmly on the cover plate 28 of the bracket 20.

By means of rotating the screw rod 31 to adjust the position of the clamps 34 and by means of the support of the fence 21, a computer 40 (for example, notebook computer) can be held on the cover plate 28 at the bracket 20 firmly. In case of horizontal inclination of the computer dock station 200, the computer 40 can still be locked to the bracket 20 firmly by means of the clamps 34 and the fence 21, preventing industrial accident. Because the clamps 34 are adjustable in the respective interval B, the computer dock station 200 fits different specifications or sizes of computers 40.

Further, multiple openings 26 are formed on the cover plate 28 and the bracket 20 as well as in between the bracket 20 and the cover plate 28 for quick dissipation of heat during operation of the computer 40 that is carried on the cover plate 28.

Figure 5:
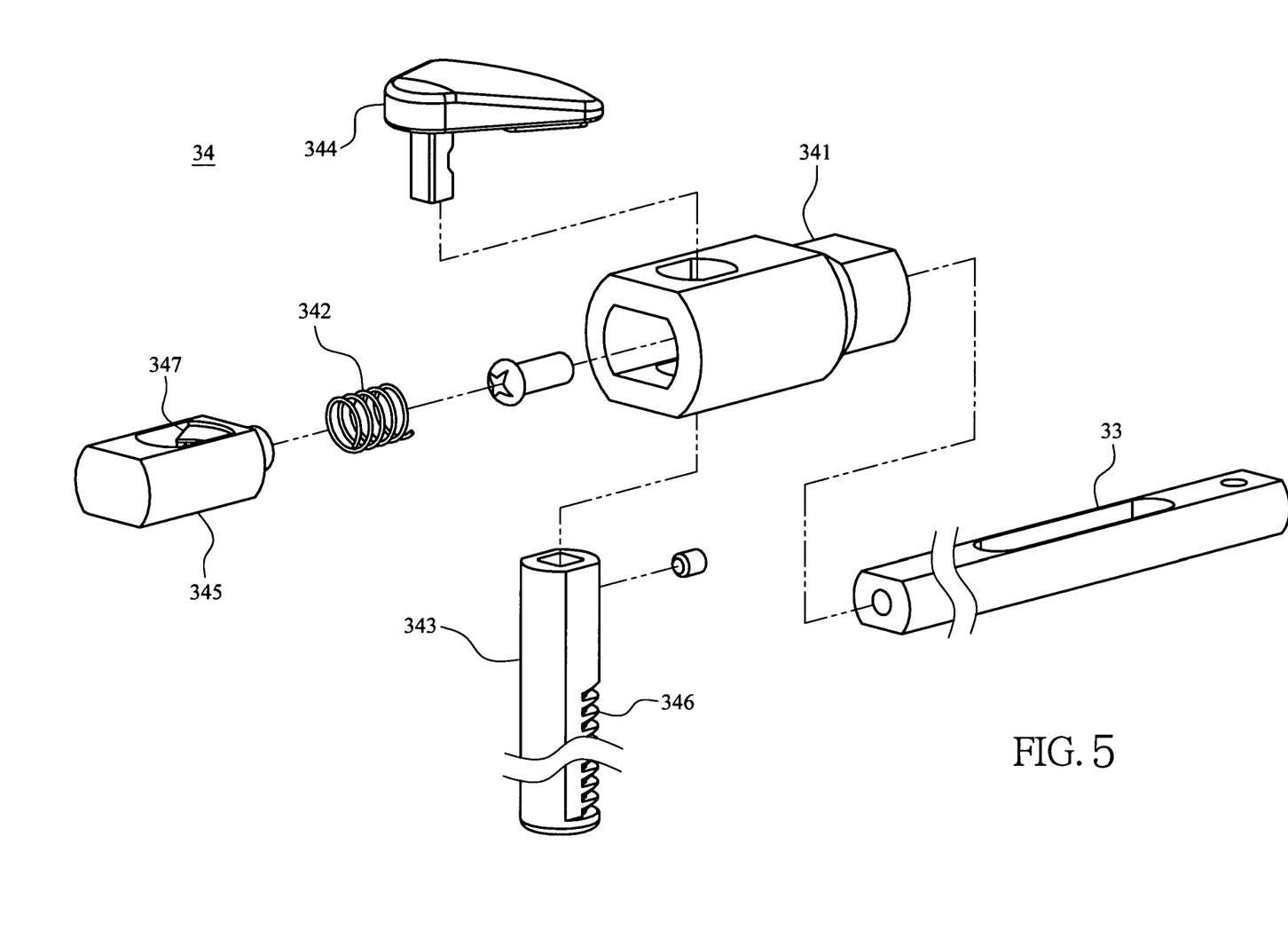
FIG. 5 is an exploded view of the locking mechanism for the computer dock station in accordance with the first embodiment of the present invention.
Figure 6:
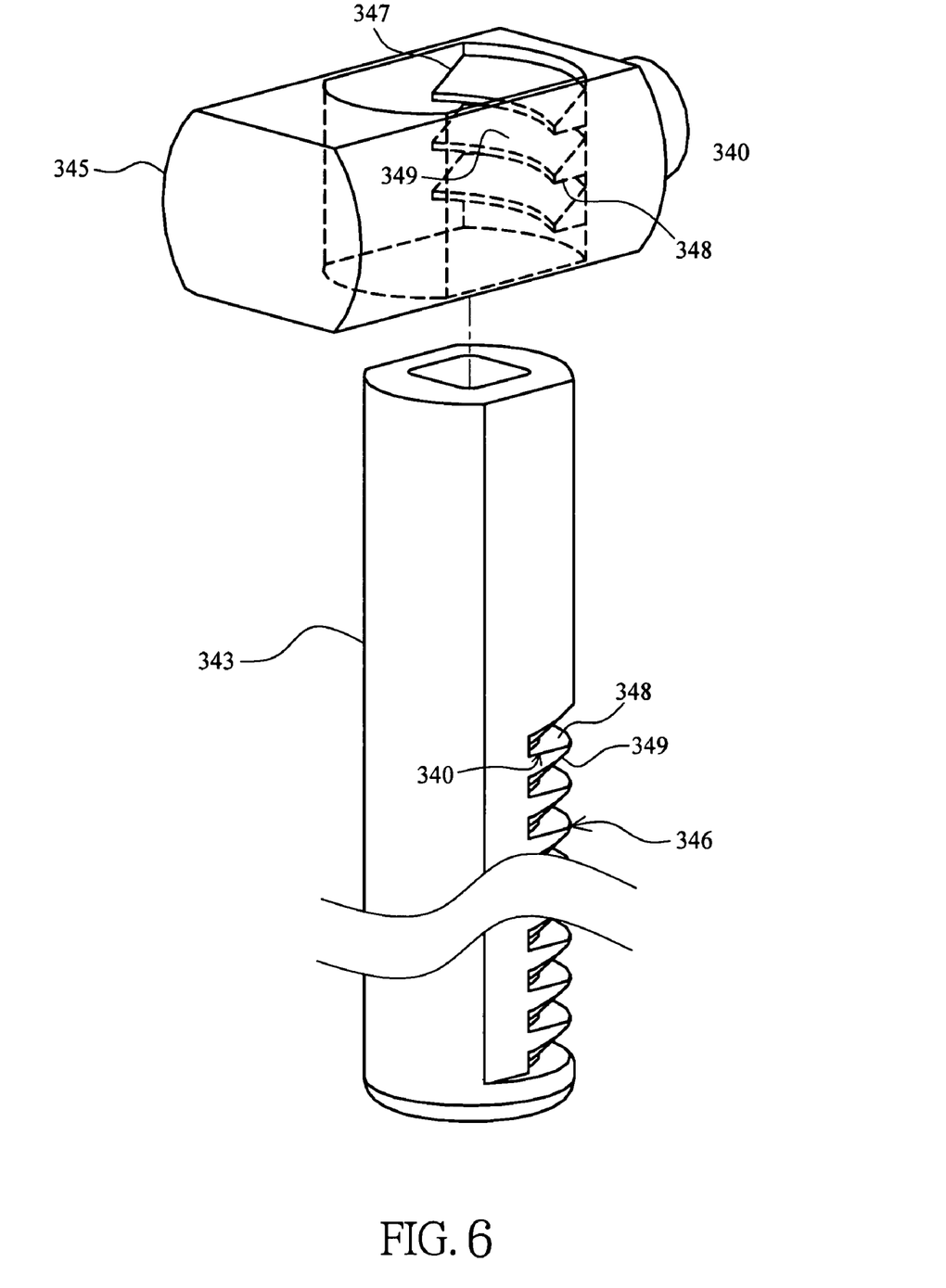
FIG. 6 is a perspective view in an enlarged scale of a part of the locking mechanism shown in FIG. 5.

Referring to FIGS. 5 and 6 and FIG. 3 again, each clamp 34 comprises a connection block 341, an elastic member 342 (for example, coil spring), an adjustment rod member 343, a clamping member 344, and an engagement block 345. By means of the connection block 341, each clamp 34 is connected to one respective follower member 33.

The engagement block 345 is partially inserted into the connection block 341. The elastic member 342 is mounted inside the connection block 341 and stopped between one end of the connection block 341 and one end of the engagement block 345. The adjustment rod member 343 is inserted through the connection block 341 and the engagement block 345 and fixedly connected to the clamping member 344, having an engagement portion 346 forced by the spring force of the elastic member 342 into engagement with an engagement portion 347 of the engagement block 345. By means of adjusting the engagement position between the engagement portion 346 of the adjustment rod member 343 and the engagement portion 347 of the engagement block 345, the elevation of the clamping member 344 is relatively changed. Therefore, the clamping member 344 can be adjusted vertically relative to the bracket 20 subject to the thickness of the computer 40 to be held.

The engagement portions 346 and 347 each are comprised of a plurality of teeth 340. The teeth 340 each have a flat face 348 at one side and a bevel face 349 at the opposite side. The engagement portions 346 of the adjustment rod member 343 is reversed to the engagement portion 347 of the engagement block 345, i.e., the flat face 348 of each tooth 340 of the adjustment rod member 343 faces the clamping plate 344 and the bevel face 349 of each tooth 340 of the engagement block 345 faces the clamping plate 344.

Figure 7:
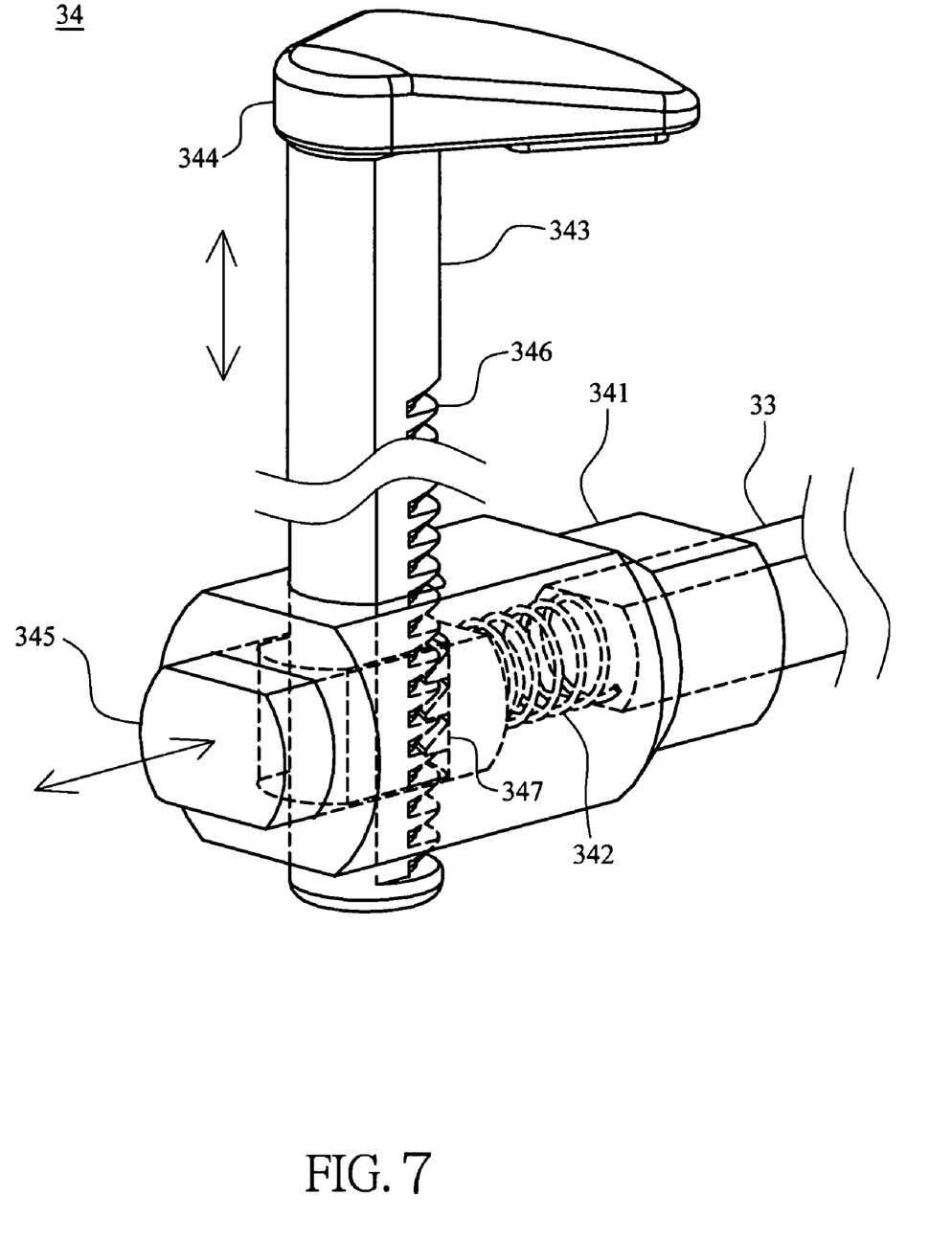
FIG. 7 is a schematic drawing showing the locking mechanism in operation according to the first embodiment of the present invention.

Referring to FIG. 7, the arrangement of bevel faces 349 of the engagement portions 346 and 347 allows the user to push the clamping member 344 in one direction toward the connection block 341 without interference. When the clamping plate 344 is forced toward the connection block 341 and closely attached to the computer 40 against the cover plate 28 at the bracket 20, the flat faces 348 of the teeth 340 of the engagement portion 346 of the adjustment rod member 343 are respectively stopped against the flat faces 348 of the teeth 340 of the engagement portion 346 of the engagement block 345, prohibiting backward movement of the clamping member 344 with the adjustment rod member 343 relative to the computer 40, and therefore the computer 40 is locked to the bracket 20. When wishing to remove the computer 40 from the bracket 20, press the engagement block 345 against the elastic member 342 to disengage its engagement portion 347 from the engagement portion 346 of the adjustment rod member 343. At this time, the user can pull the clamping member 344 away from the computer 40, unlocking the computer 40.

Figure 8A:
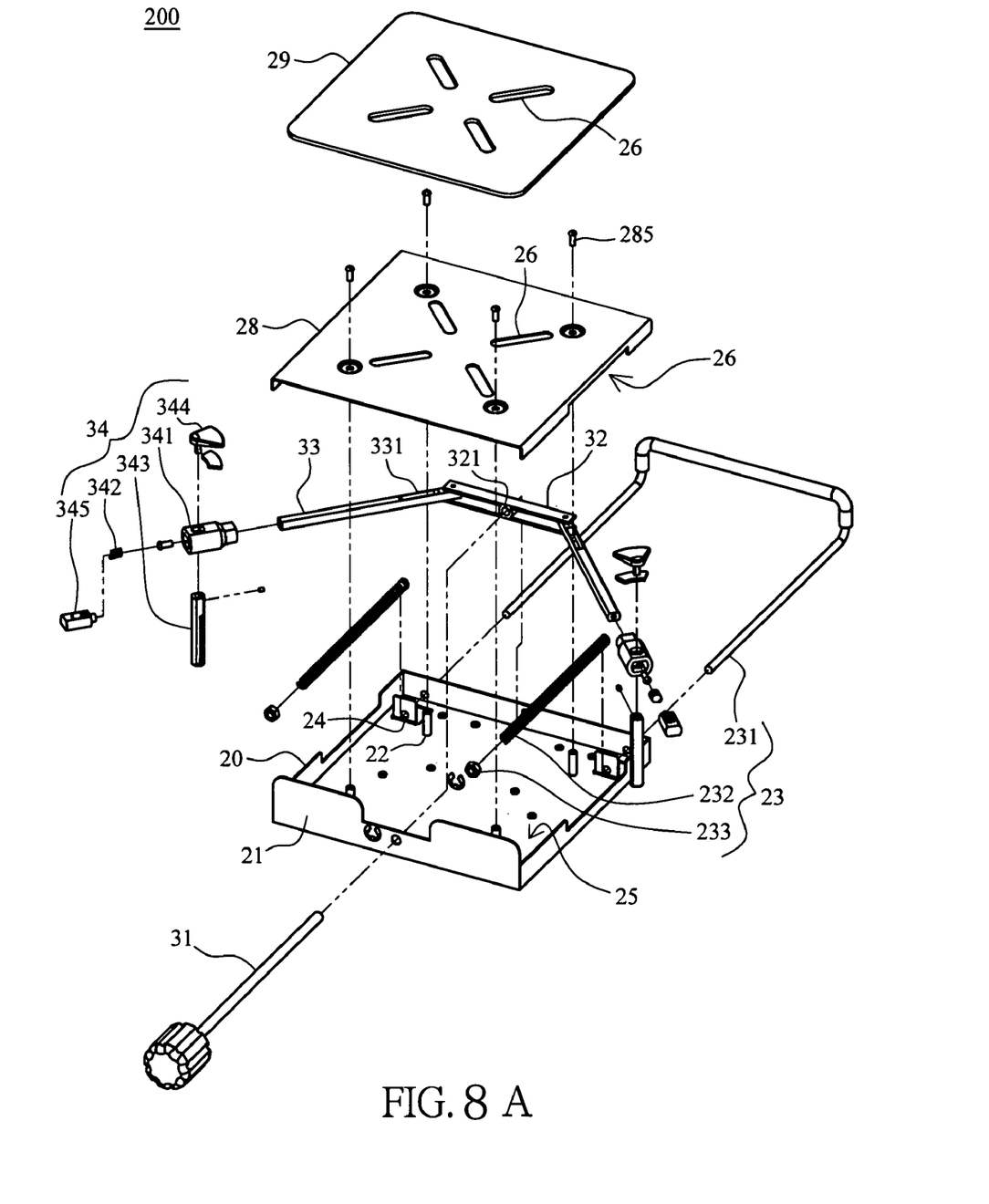
FIG. 8A is an exploded view of a computer dock station in accordance with a second embodiment of the present invention.
Figure 8B:
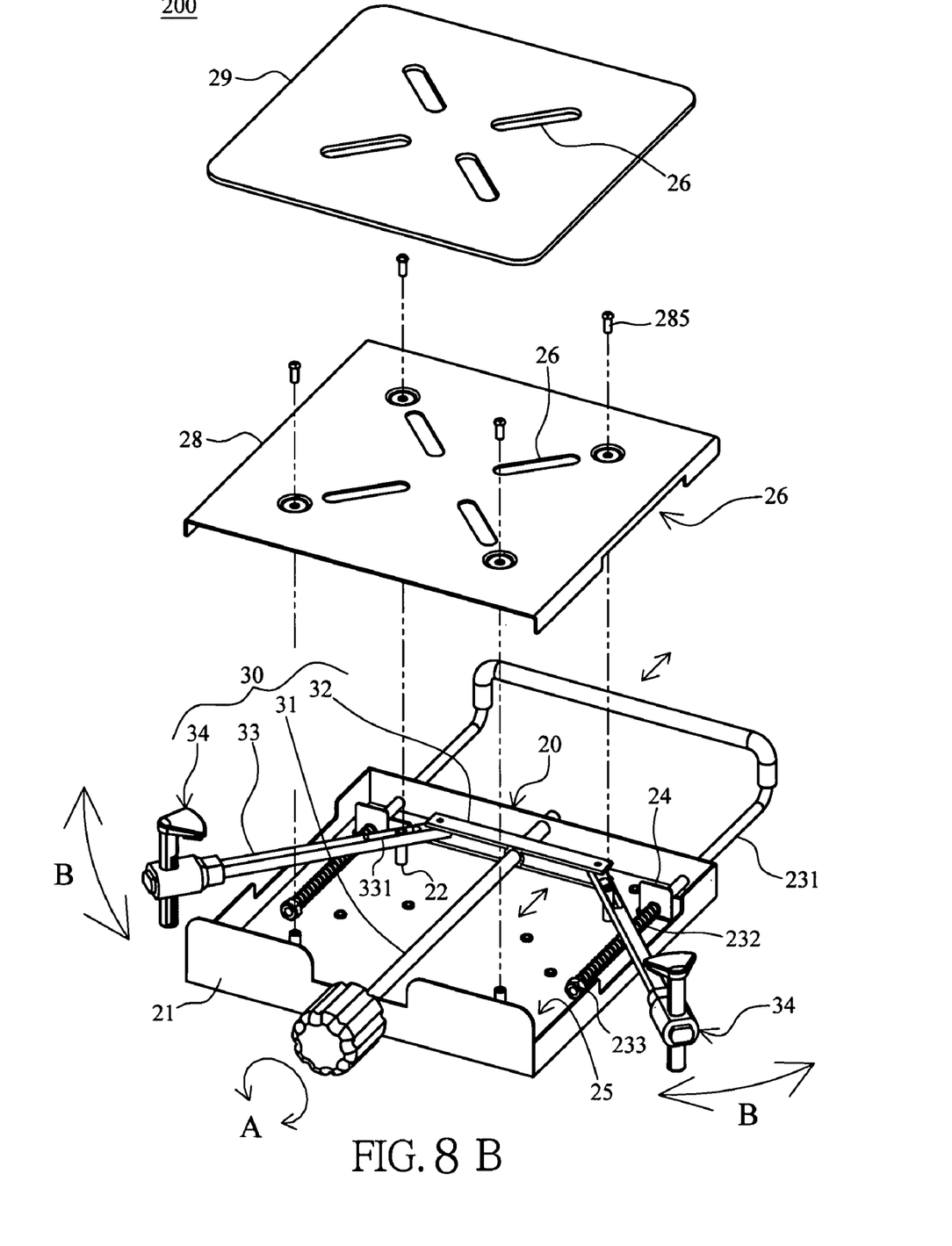
FIG. 8B is a schematic assembly view in an enlarged scale of a part of FIG. 8A.
Figure 8C:
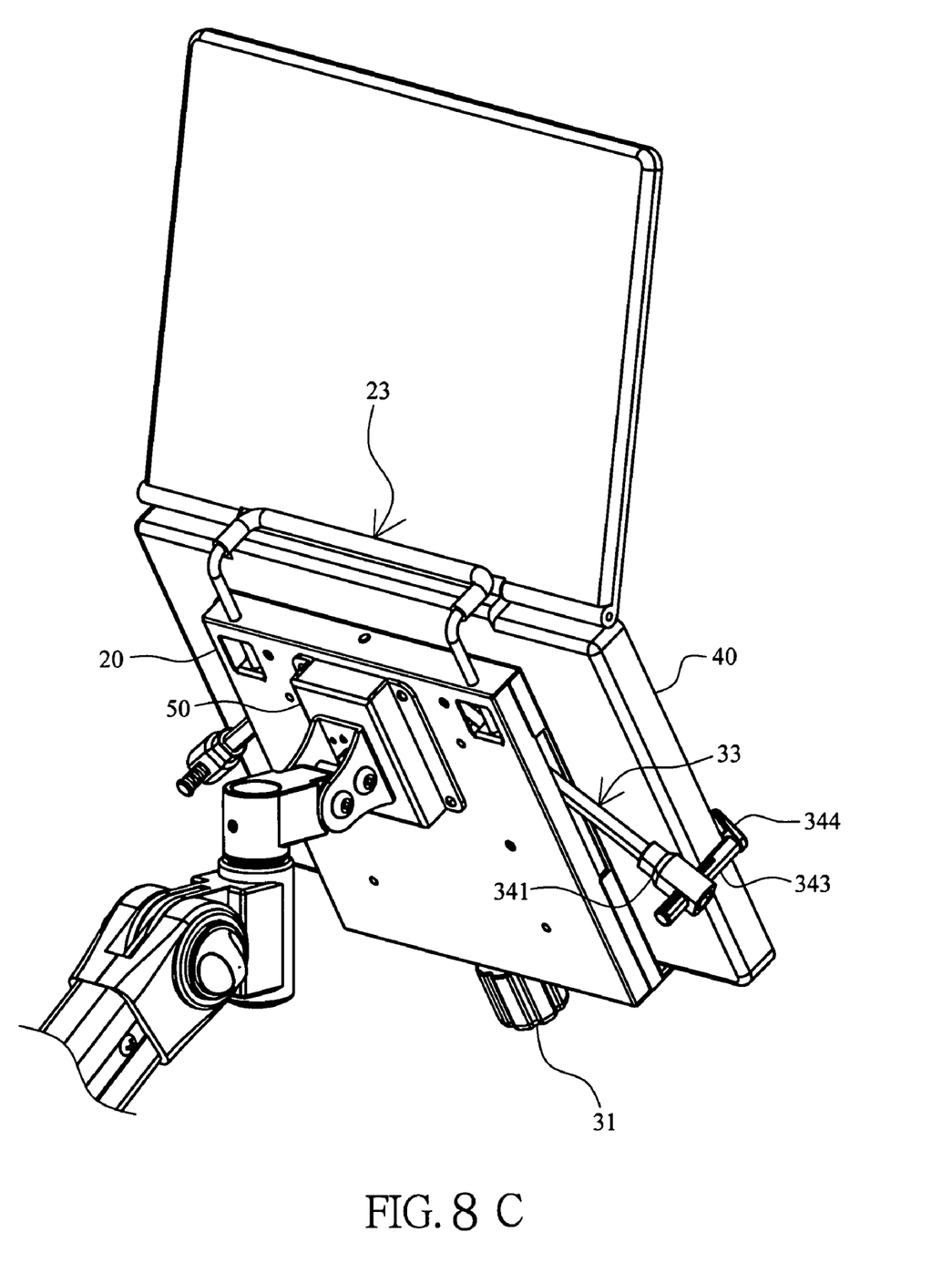
FIG. 8C is a schematic drawing showing an application example of the computer dock station in accordance with the second embodiment of the present invention.

FIGS. 8A~8C show a computer dock station 200 in accordance with a second embodiment of the present invention. This embodiment is substantially similar to the aforesaid first embodiment with the exception of the added spring clamp 23. The spring clamp 23 is coupled to the bracket 20 at one side opposite to the fence 21 for clamping on one side of the computer 40 against the fence 21, enhancing stability of the computer 40 on the computer dock station 200. According to this embodiment, the spring clamp 23 and the fence 21 are respectively disposed at the front and rear sides relative to the bracket 20, and the clamps 34 are disposed at two opposite lateral sides relative to the bracket 20. Therefore, the computer dock station 200 gives a clamping force to the computer 40 from four sides, holding the computer 40 firmly in place.

The spring clamp 23 comprises a clamping bar 231, two elastic compression members, for example, compression springs 232, two locating members, for example, nuts 233, and two second stop members 24. The clamping bar 231 has its two opposite ends arranged in parallel and respectively inserted through the second stop members 24. The nuts 233 are respectively threaded onto the two distal ends of the clamping bar 231. The compression springs 232 are respectively sleeved onto the two opposite ends of the clamping bar 231 and respectively stopped between the nuts 233 and the second stop members 24. Further, a cushion pad 29 is adhered to the top surface of the cover plate 28 to decorate the computer dock station 200 and to keep the screws 285 from sight and, preventing damage of the computer 40 by the screws 285. When pulling the clamping bar 231 outwards relative to the bracket 20, the computer 40 can then be put on the cushion pad 29. When release the hand from the clamping bar 231, the compression springs 232 immediately push the nuts 233 away from the second stop members 24, forcing the clamping bar 231 to clamp on the computer 40.

Further, a mount 50 is provided at the back side of the bracket 20 for fastening to, for example, a mechanical arm (see FIG. 8C).

Figure 9A:
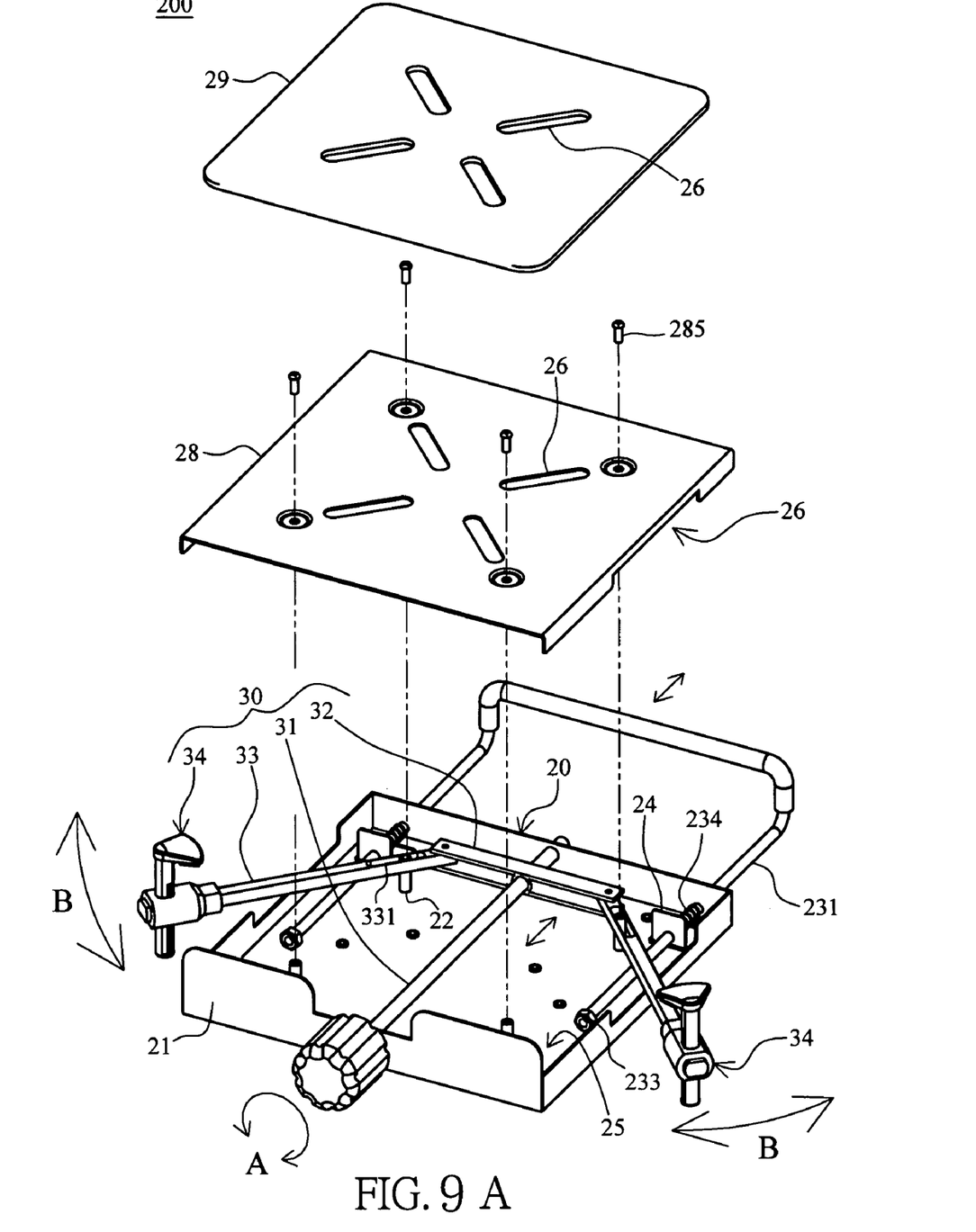
FIG. 9A is an exploded view of a computer dock station in accordance with a third embodiment of the present invention.
Figure 9B:
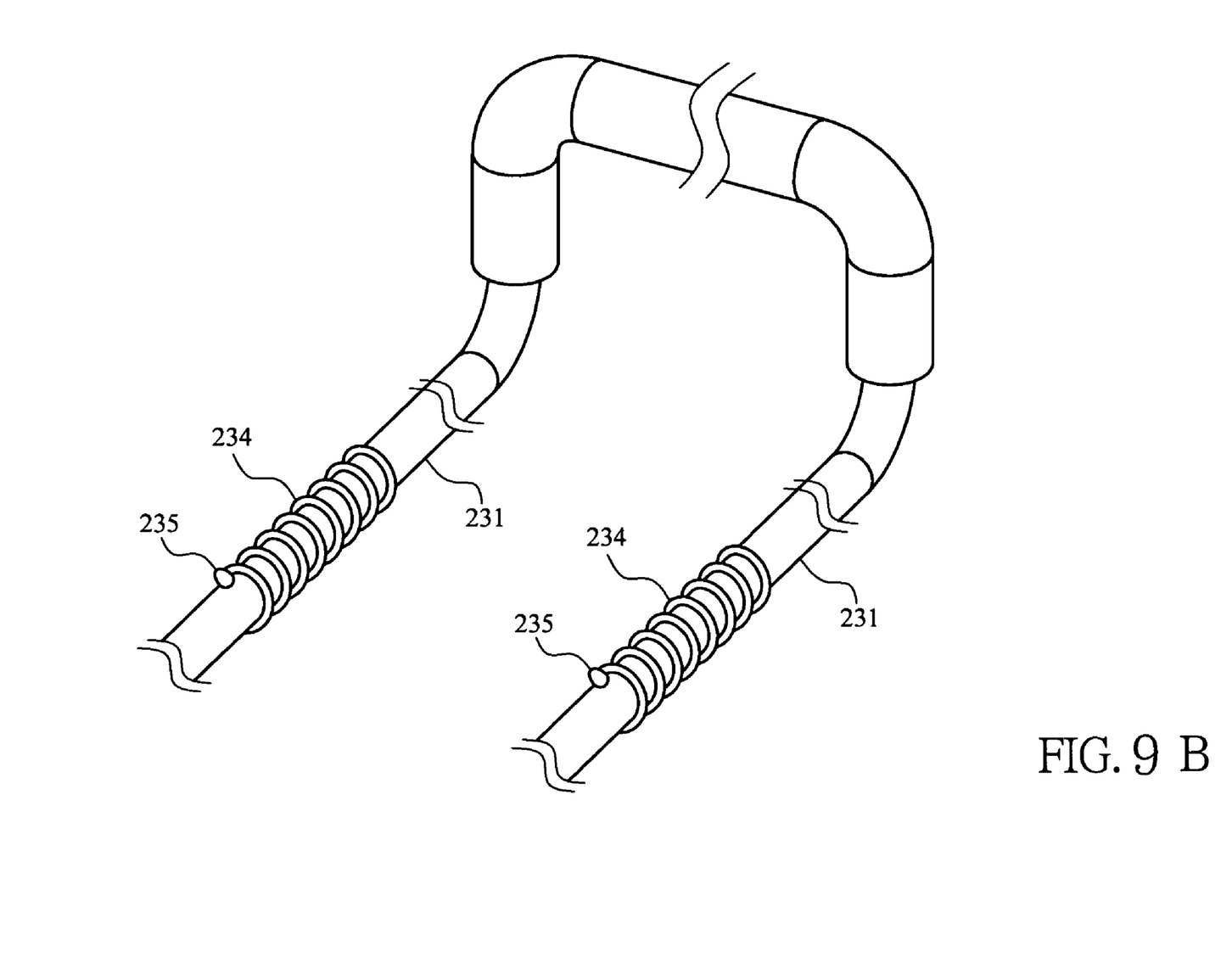
FIG. 9B is an schematic drawing in an enlarged scale of a part of the spring clamp shown in FIG. 9A.

FIG. 9A and FIG. 9B show a computer dock station 200 in accordance with a third embodiment of the present invention. This embodiment is substantially similar to the aforesaid second embodiment with the exception of the spring clamp 23. According to this embodiment, the spring clamp 23 comprises a clamping bar 231, two elastic tensile members, for example, tensile springs 234, two third stop members 235 (see FIG. 9B), and two second stop members 24. The clamping bar 231 has its two opposite ends arranged in parallel and respectively inserted through the second stop members 24 and the third stop members 235 are respectively disposed on the two opposite ends of the clamping bar 231, for example, a jut protrude out from the surface of the clamping bar 231 (see FIG. 9B). The tensile springs 234 are respectively sleeved onto the two opposite ends of the clamping bar 231 and respectively stopped between the third stop members 235 and a part of the bracket 20. When pulling the clamping bar 231 outwards relative to the bracket 20, the computer 40 can then be put on the cushion pad 29 and then clamped by the clamping bar 231.

The screw rod 31 and the follower member 33 are respectively connected to the motive member 32 and partially extending to the outside of the accommodation chamber 25. The clamping bar 231 is inserted through the second stop members 24 and partially extending to the outside of the accommodation chamber 25. The locking mechanism 30 and the spring clamp 23 can also be disposed outside the accommodation chamber 25. For example, the locking mechanism 30 and the spring clamp 23 can be provided at the bottom side of the bracket 20 outside the accommodation chamber 25.

Figure 10:
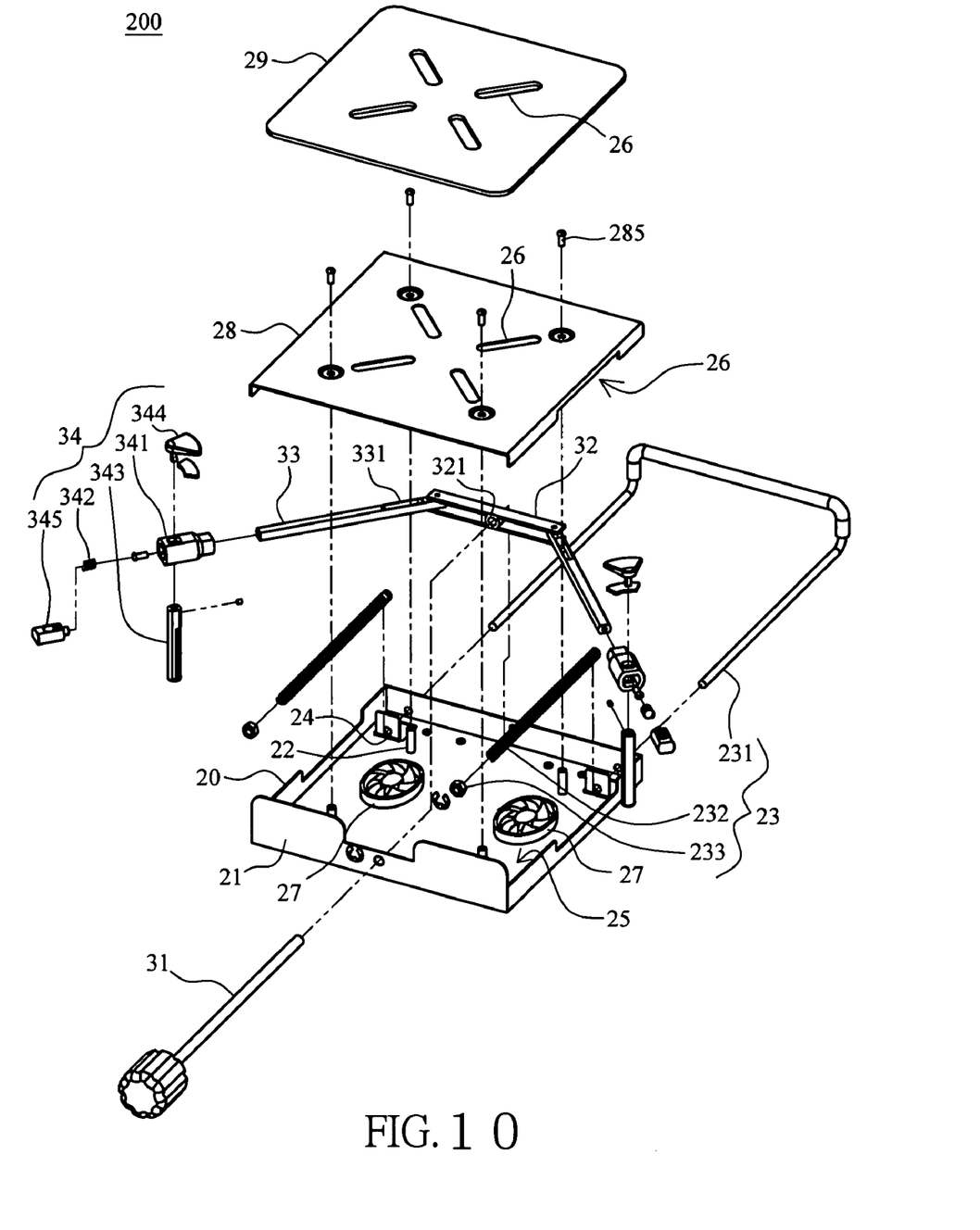
FIG. 10 is an exploded view of a computer dock station in accordance with a fourth embodiment of the present invention.

FIG. 10 shows a computer dock station 200 in accordance with a fourth embodiment of the present invention. This embodiment is substantially similar to the aforesaid second embodiment with the exception of the added cooling fans 27. As illustrated, two cooling fans 27 are mounted in the accommodation chamber 25. During operation of the computer 40, the cooling fans 27 are started to cause currents of air, dissipating heat from the computer 40.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A computer dock station comprising:
    a bracket, said bracket comprising a first stop member disposed at one side for stopping a computer, and a plurality of upright pivot pins;
    a cover member covering said bracket for supporting a computer on said bracket; and
    a locking mechanism for locking a computer on said cover member, said locking mechanism comprising a motive member, said motive member having two opposite ends and a screw hole equally spaced from the two opposite ends, a plurality of follower members, said follower members each having a first end respectively pivoted to the two opposite ends of said motive member, a second end, and a sliding slot disposed between the first end and the second end and respectively coupled to the upright pivot pins of said bracket, a screw rod inserted through said first top member and threaded into the screw hole of said motive member and pivoted to a part of said bracket and rotatable to move said motive member in said bracket, and a plurality of clamps respectively provided at the second ends of said follower members for clamping a computer on said cover member.

2. The computer dock station as claimed in claim 1, wherein said clamps each comprise:
    a connection block fixed to the second end of one of said follower member;
    an engagement block inserted into said connection block and movable in a first direction relative to said connection block between a locking position and an unlocking position, said engagement block comprising an engagement portion;
    an adjustment rod member inserted through said engagement block and said connection block and movable in a second direction relative to said connection block and said engagement block, said second direction being perpendicular to said first direction, said adjustment rod comprising an engagement portion for engagement with the engagement portion of said engagement block when said engagement block is in said locking position;
    a clamping member fixedly fastened to one end of said adjustment rod member for clamping a computer on said cover member; and
    an elastic member mounted in said connection block and stopped against said engagement block to hold said engagement block in said locking position.

3. The computer dock station as claimed in claim 2, wherein the engagement portion of said engagement block and the engagement portion of said adjustment rod member each comprise a plurality of teeth, and the teeth of the engagement portions of said engagement block and said adjustment rod member each have a flat face at one side and a bevel face at an opposite side.

4. The computer dock station as claimed in claim 2, wherein the elastic member of each of said clamps is a coil spring.

5. The computer dock station as claimed in claim 1, wherein said bracket comprises a spring clamp disposed at one side thereof opposite to said first stop member for clamping a computer on said cover member.

6. The computer dock station as claimed in claim 5, wherein said spring clamp comprises two second stop members mounted inside said bracket, a clamping bar for clamping a computer on said cover member, said camping bar having two distal ends respectively inserted through said second stop members, two locating members respectively affixed to the two distal ends of said clamping bar, and a plurality of elastic compression members respectively mounted on the two distal ends of said clamping bar and stopped between said locating members and said second stop members.

7. The computer dock station as claimed in claim 6, wherein said elastic compression members are compression springs, and said locating members are nuts.

8. The computer dock station as claimed in claim 1, wherein said cover member has a top surface covered with a flat cushion pad.

9. The computer dock station as claimed in claim 5, wherein said spring clamp comprises two second stop members mounted inside said bracket, a clamping bar for clamping a computer on said cover member, said clamping bar having two distal ends respectively inserted through said second stop members, two locating members respectively affixed to the two distal ends of said clamping bar, and a plurality of elastic tensile members respectively mounted on the two distal ends of said clamping bar between said locating members and a part of said bracket.

10. The computer dock station as claimed in claim 9, wherein said elastic tensile members are tensile springs, and said locating members are nuts.

11. The computer dock station as claimed in claim 1, wherein said bracket is a box member covered by said cover member, defining with said cover member an accommodation chamber, said bracket and said cover member each having a plurality of openings for ventilation.

12. The computer dock station as claimed in claim 11, further comprising at least one cooling fan mounted in said accommodation chamber.

13. The computer dock station as claimed in claim 1, wherein said bracket has an opening.

14. The computer dock station as claimed in claim 1, wherein said bracket comprises a mount fixedly provided at a back side thereof.

* * * * *